(12) United States Patent
Bonham et al.

(10) Patent No.: US 12,207,023 B2
(45) Date of Patent: Jan. 21, 2025

(54) SYSTEM AND METHOD FOR EXCHANGING COMPRESSED IMAGES OVER LORAWAN GATEWAYS

(71) Applicants: Douglas M Bonham, Essex, MT (US); Connie Woodman, Dripping Springs, TX (US)

(72) Inventors: Douglas M Bonham, Essex, MT (US); Connie Woodman, Dripping Springs, TX (US)

( * ) Notice: Subject to any disclaimer, the term of this patent is extended or adjusted under 35 U.S.C. 154(b) by 0 days.

(21) Appl. No.: 17/578,431

(22) Filed: Jan. 18, 2022

(65) Prior Publication Data

US 2023/0231976 A1     Jul. 20, 2023

(51) Int. Cl.
  *H04N 7/18*     (2006.01)
  *H04N 1/00*     (2006.01)
  *H04N 23/80*    (2023.01)

(52) U.S. Cl.
  CPC ......... *H04N 7/183* (2013.01); *H04N 1/00222* (2013.01); *H04N 23/80* (2023.01)

(58) Field of Classification Search
  None
  See application file for complete search history.

(56) References Cited

U.S. PATENT DOCUMENTS

| | | | |
|---|---|---|---|
| 11,627,946 B2* | 4/2023 | Capodilupo | G16H 20/30 600/301 |
| 2018/0053408 A1* | 2/2018 | Siminoff | G06T 7/20 |
| 2018/0279921 A1* | 10/2018 | Datta | A61B 5/7267 |
| 2023/0044362 A1* | 2/2023 | Ulen | H04L 9/14 |

* cited by examiner

*Primary Examiner* — Samira Monshi
(74) *Attorney, Agent, or Firm* — Sandy Lipkin

(57) ABSTRACT

A system and method for creating small data size representations of images, created on the image detection device, over wireless connections when there is insufficient bandwidth to support detailed images is disclosed. Image data size is often too large to send over low-powered long-distance wireless connections. Image data must be dramatically reduced to enable use of the lowest-power longest-distance wireless platforms including LoRa with LoRaWAN. Common image compression algorithms include jpeg and mpeg that provide only moderate reductions in data size. The described invention reduces data size beyond jpeg compression by reducing targeted image objects to simple outlines, contours or vectors. Monitoring security, wildlife, agricultural and other natural events require images of objects including insects, crops, livestock, wildlife or intruders. Contours, outlines or vectors of targeted objects are often sufficiently recognizable to provide useful information.

15 Claims, 5 Drawing Sheets

SYSTEM AND METHOD FOR EXCHANGING COMPRESSED IMAGES OVER LORAWAN GATEWAYS

CROSS-REFERENCE TO RELATED APPLICATIONS

This application claims the benefit of U.S. Provisional Patent Application No. 63/139,724 filed on Jan. 20, 2021.

FIELD OF THE INVENTION

This invention relates to a wireless imaging system and method for remotely monitoring agriculture, security and wildlife.

BACKGROUND OF THE INVENTION

The last fifteen years has witnessed a dramatic expansion of internet processing capability to wirelessly connected devices beyond traditional computers and phones, widely known as the Internet of Things (IoT). A wireless platform and protocol was introduced in 2015 and accepted by the International Telecommunications Union (ITU) in 2021 to meet the need for small battery-powered IoT devices that require a low-powered long-distance wireless connection to the internet and was called the 'LoRa Allicance.' LoRa LoRa is a proprietary low-power wide-area network modulation technique that optimizes power and distance for tiny packets of sensor and control data to or from IoT devices. LoRa was expanded to LoRaWAN by adding software that created the ability for individual LoRa devices to form networks that pass data from one device to another until it reaches an internet connection point. LoRaWAN Gateways are the bridge between end nodes and a network. To receive information from the end nodes, gateways are equipped with a LoRa concentrator and are often considered as a router of sorts. LoRaWAN devices can be one or two miles from each other and still maintain connectivity. Distances of ten or twenty miles can be achieved from hilltop to hilltop. LoRaWAN has been an ideal solution for agriculture and other applications that require small packets of data sent over large remote areas without per-byte data cost. LoRaWAN has been growing at 47% annual growth and is expected to become a $5 billion market by 2027 (GPS World 2020).

LoRaWAN achieved its impressive power and distance performance by reducing data size to tiny packets of data that are suitable only for simple sensors and control devices, typically less than a couple of hundred bytes per minute. Sending even a small compressed still images at LoRaWAN data rates takes many hours or days, and video is not practically feasible. However, there are still substantial needs to receive low-cost image and video data from locations beyond internet and cellular connectivity. Agricultural operations can benefit from receiving images of livestock location, plant growth, invasive insect pests and critical insect pollinators. Security applications can benefit from images of intruders. Wildlife and other field sciences benefit from images of animal presence, absence and behavior. Expanding near real-time image internet connectivity without cellular or satellite data packet charges to remote locations would have substantial economic and scientific value. Doing so over LoRaWAN is held back by limitations of image compression algorithms. Widely used JPEG image compression can reduce a small 640×480 (VGA) 24-bit color still image from 921,600 bytes to about 60,000 bytes. This reduces LoRaWAN wireless transmission time from about 3 days to about 5 hours. Five hours is still a long time to wait for one small jpeg still image of time-sensitive actionable information. The disclosed invention reduces the LoRaWAN transmission time to a few minutes by processing the image at the remote device to extract only critical contours and measurements of targeted objects. In many cases, a rough outline and measurements of a targeted and/or moving object is sufficiently informative to trigger user responses or further processing by cloud computing services. User or cloud computer responses can include a control signal reply to the remote device that the image is valuable enough to store or take the time to send a more complete image.

The converting of digital image files into vector files is not new—for example, U.S. Pat. No. 6,356,274B1 granted to Spector disclosed a system that relies on color zones to convert digital images into line drawings. United States Patent No. US20080229238A1 granted to Young discloses a system that converts bitmap images into smaller size vector images. However, these systems do not incorporate digital dictionaries that can minimize file size even further. U.S. Pat. No. 4,542,412A granted to Fuse, et. al. discloses a method for compressing digital images for transfer efficiency purposes. This tool compresses image data size while retaining most or all of the original image's integrity. However, it does not rely on subject matter outlines to compress files further. Chinese Patent No. CN102833537A teaches of a layering system to compress digital images however, it is focused on removing JPEG-type artifacts when recording figures on a textured or flat backgrounds such as hand writing on parchments etc. What is needed is a system that captures the bare minimum outline of recognizable objects and relies on pre-defined, dictionary references so that file sizes can be reduced even further for compatibility with edge computing technologies such as LoRa and LoRaWAN.

SUMMARY OF THE INVENTION

This invention relates to a new and useful system and method for communicating image-based information across LoRaWAN wireless links. More specifically this invention includes an image acquisition device (herein referred to as a 'remote device') in a location that is not easily provided with a wired or high-bandwidth wireless connection to the internet or other computer or user. Said remote device having onboard digital image processing software to automatically identify objects of interest in an acquired image and reducing the full image to smaller portions made up of outlines, contours or measurement vectors, of the object of interest. Said remote device is then able to wirelessly transmit the portions, outlines, contours or measurements in a file which can be transmitted with much less bandwidth than files of the full images. Other embodiments of the device are able to store more complete images in case additional computer processing or user inspection warrants use or transmission of more complete images.

The digital image processing software on the device can include algorithms including background subtraction to isolate moving objects, cropping, smoothing, sharpening, thresholding to amplify and clarify objects, contouring and landmark detection (Villan 2019). These image processing methods dramatically reduce the number of bytes of data that need to be transmitted over limited wireless connections.

To reduce the amount of information in a graphic, one form of graphical compression is the use of shape dictionaries, the DjVu compression format from LizardTech, Inc., and the JBIG2 compression format from the Joint Bi-level Image Experts Group can be exemplified. In these formats, unique visual representations are saved to a dictionary and the image is transmitted and reconstructed by assembling these dictionary references into a final image that is similar to the initial, uncompressed image.

In this invention, unlike DjVU and JBIG2, the dictionary is almost entirely pre-constructed, by contrast the previously mentioned formats can create novel libraries for each file. In this invention the dictionary is stored on the device and data receiving end, as sending the dictionary over limited LoRaWAN bandwidth would be prohibitive. If an element is very different from the dictionary, it will be stored as vector art or pixel art and added to the image dictionary as a novel entry. Other embodiments of the disclosure utilize dictionaries of defined graphical or vector art elements. The device consists of an enclosure containing an electronic circuit board, image sensor, optical lens and LoRa transceiver, antenna, onboard battery and optional solar cell for charging the onboard battery. The electronic circuit board supports a central processing unit, memory, image sensor, battery interface and LoRa transceiver interface.

DETAILED DESCRIPTION OF THE PREFERRED EMBODIMENT

Figure 1:
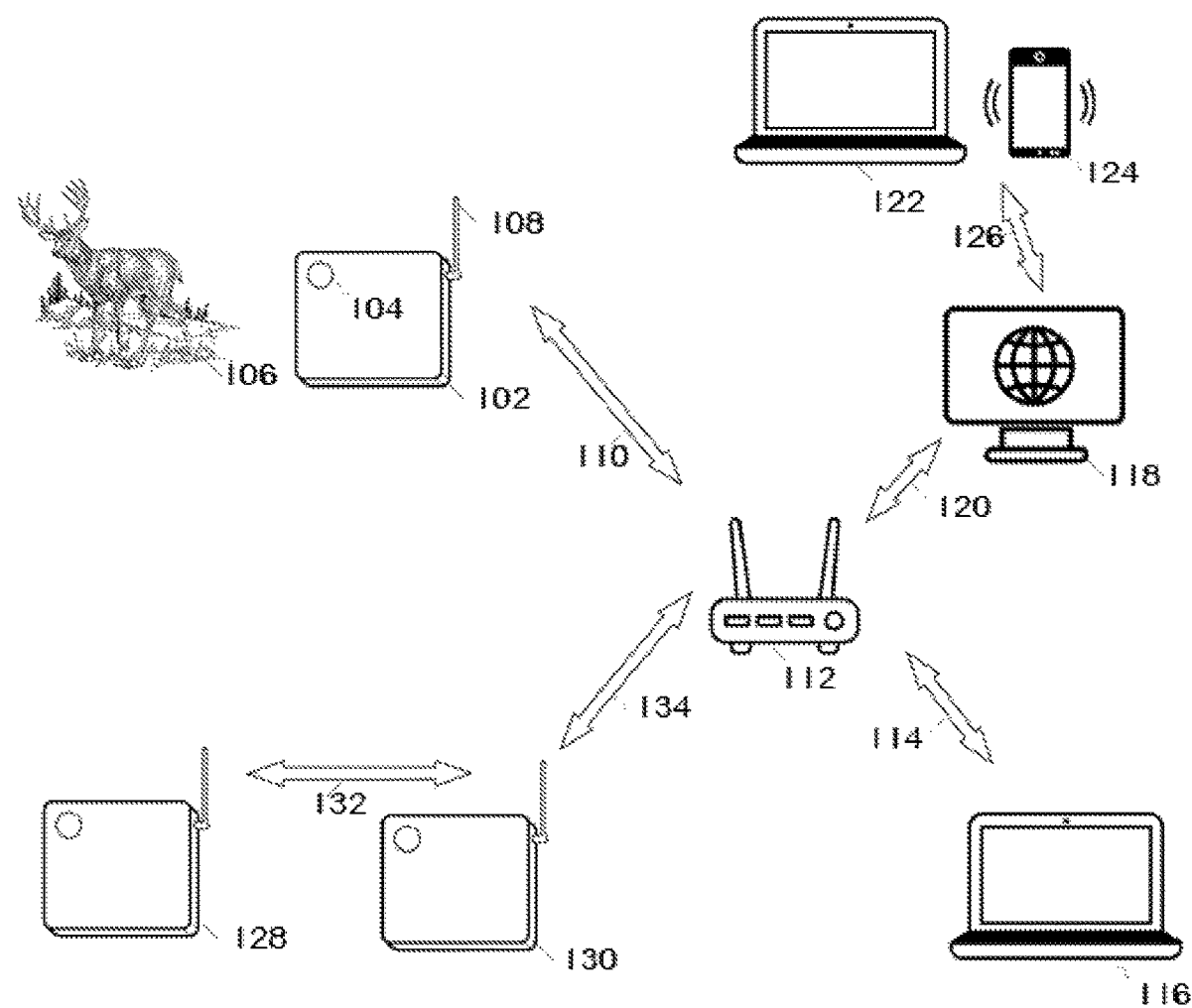
FIG. 1 illustrates how LoRaWAN devices can be deployed in remote field locations to exchange image based information with users or cloud based computing resources.

FIG. 1 depicts a wireless network configuration that includes a remote device 102 capable of acquiring and processing images for transmission over a LoRaWAN network. Remote device 102 has an optical lens 104 for acquiring images of field conditions 106. Remote device 102 has an antenna 108 for wireless transmission of data 110 between remote device 102 and a LoRaWAN gateway 112. When internet access is not needed or not practical, LoRaWAN gateway 112 can provide field data to a nearby user device (typically a computer) 116 via various options for a data connection 114 including an Ethernet cable, USB cable or WiFi. Options for connection types and formats are provided by the manufacturer of the LoRaWAN gateway 112 and user device 116.

In cases where an internet 26 connection is needed or available, the gateway 112 manufacturer provides options for connection types that can include WiFi, Ethernet, USB or an LTE cellular connection 120. After the data reaches LoRaWAN server software on the internet 118, end users of the data can access it via a computer 122 or smartphone 124 via various data connection types 126. When LoRaWAN is used instead of simple LoRa, multiple remote devices 102, 128 and 130 can form networks. A distantly located remote device 128 can use an intermediate device 130 as a relay or bridge for data that must make multiple hops 132 and 134 to communicate with gateway 112.

Figure 2:
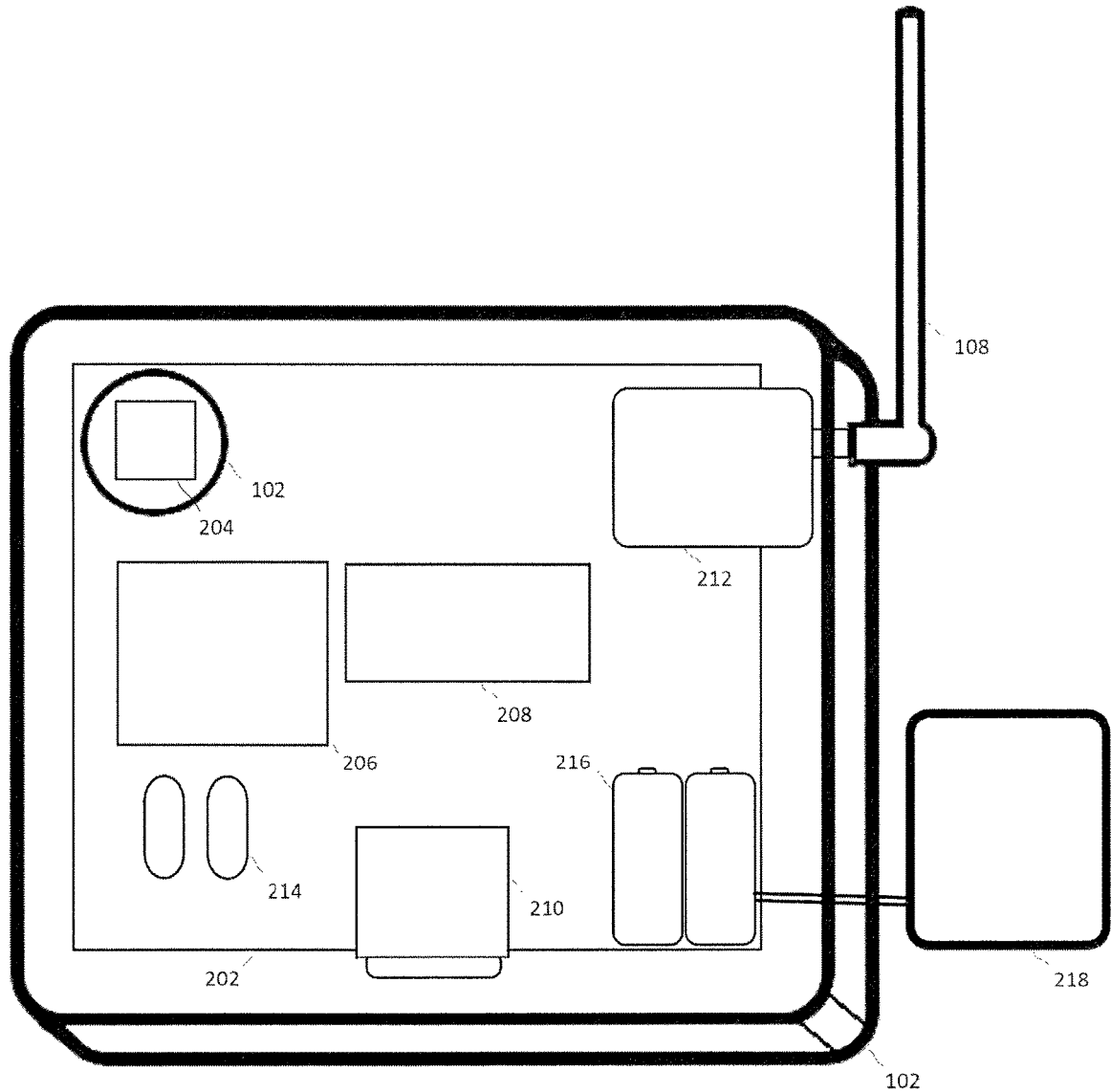
FIG. 2 illustrates components inside of a field device that can digitally process image information for exchange over long-range low-powered wireless connections.

FIG. 2 depicts components inside of a remote device 102. Inside of remote device 102 is a printed circuit board 44 with electronic components that are chosen to acquire, process, store and transmit field data. Remote device 102 has an optical lens 102 that focuses an image onto image sensor 204. Image sensor 204 can respond to visible or infrared light. Data from image sensor 204 is acquired by central processing unit (CPU) 206 and stored temporarily in memory 208. CPU 206 can store data in removable storage 210. Removable storage 210 can be in the form of an SD card, microSD card or USB storage device. CPU 206 also controls the transmission and reception of data through the LoRa or LoRaWAN module 54. LoRaWAN module 212 can use either an internal or external antenna 108 to communicate with other remote devices or users and the internet. CPU 206 can acquire, store and transmit data from various sensors 214 in addition to image data including infrared motion, temperature, humidity, barometric pressure, ambient light and GPS location. Electronic components on printed circuit board 202 can be powered by either primary or secondary batteries 216. Secondary batteries provide for automatic recharging in the field with optional solar panel 218.

Figure 3:
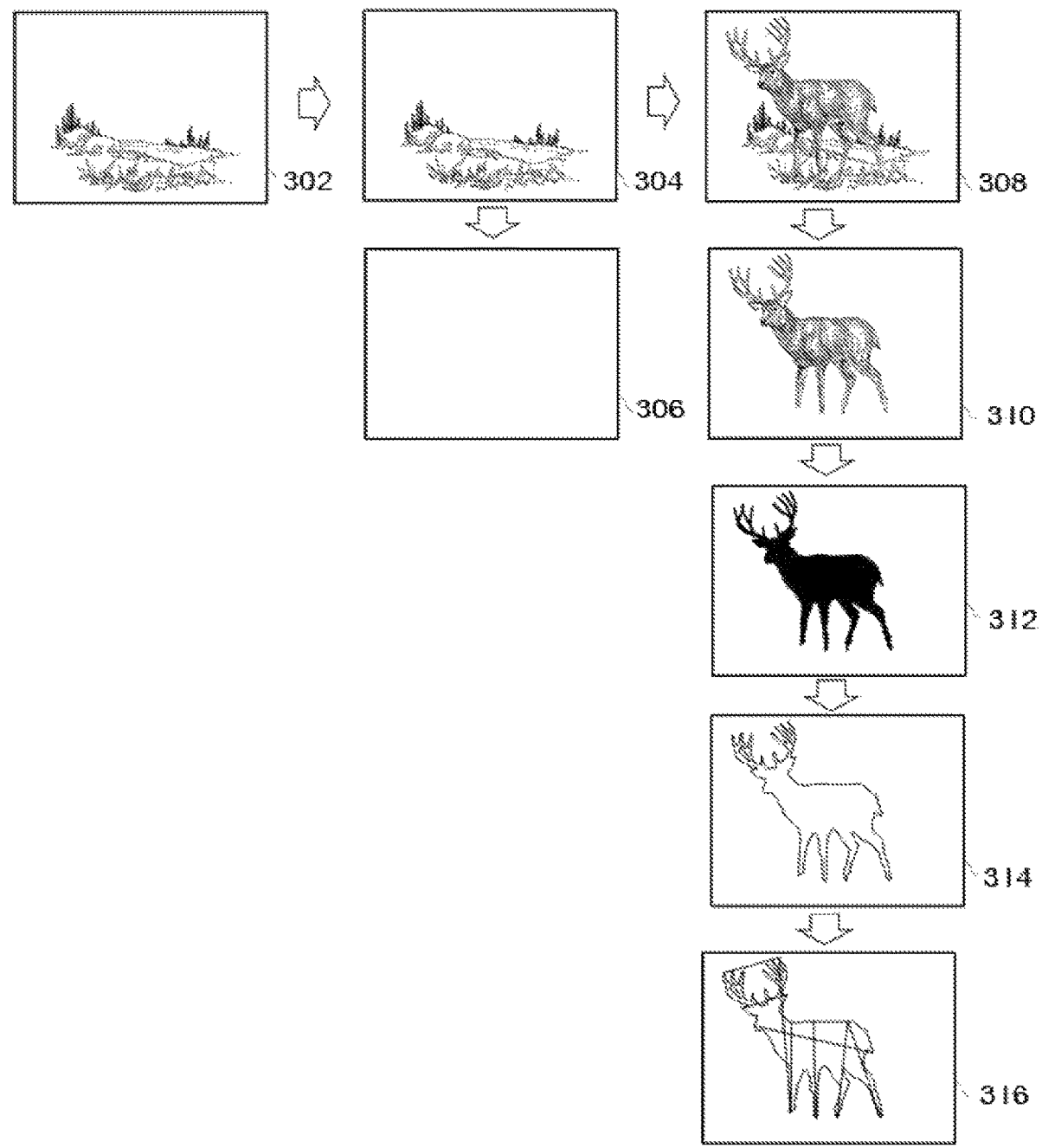
FIG. 3 illustrates a decision tree progression of digital image processing steps that can reduce the size of image information to small packets that can be exchanged over long-range low-powered wireless connections.

FIG. 3 depicts digital imaging processing steps that onboard digital image processing software performs to dramatically reduce the size of data from an image sensor so that useful information derived from the original image can be efficiently transmitted over limited bandwidth wireless connections. Said software being a non-transitory computer readable medium including computer readable instructions with various algorithms and routines to be discussed herein. The most useful information from an image often involves the size and shape of a moving object. Moving objects can be detected by infrared sensors or image processing or a combination of both. FIG. 3 depicts how a moving object can be detected by background subtraction. Image 302 was taken first. Image 304 was taken several seconds after image 302 (system designers can configure the amount of time between images based on how fast a target object is expected to pass through the image sensor's field of view). In the case of images 302 and 304, there were no moving objects which results in two images that are almost identical.

Data from image sensor 204 is acquired and stored by CPU 206 as an array of pixels. Each pixel in a typical 24-bit color scheme has a value between 0 and 255 for each of three color channels. CPU can subtract a static, 'baseline background' by creating a new image by stepping through each of the pixels from two images 302 and 304 and subtracting corresponding pixel colors. When images 302 and 304 are almost identical, subtracting corresponding pixel color channels results in a value close to zero. The absolute value of this small (often zero) value from the color channels blank value (255 in this example) results in image 306 which is mostly blank.

When the same process is applied to subsequent 'search images' 304 and 308, many of the pixels are not identical because a new object has now moved into the image sensor's field of view. When these images are subtracted, the new object is revealed against a blank background (image 310). The next image processing step can be thresholding where CPU 48 steps through each of the subtracted pixels to determine if it is above or below a threshold. If a pixel color value is above the threshold and close to the blank value of 255, it is changed to be exactly 255. If a pixel color value is below the threshold (further away from blank) its value is changed to 0 (black). The result is depicted as image 312. The image processing performed to arrive at image 312 has already dramatically reduced the data size of the image. For example, if the original images 302, 304 and 308 were 1200×600 24-bit bitmap images, the file size would be 5,760,000 bytes and would require about 20 days to transmit over a LoRa wireless connection. Image 312 could be transmitted as a black and white bitmap that is 240,000 bytes and would take only 20 hours to transmit instead of 20 days. It could be further compressed by a jpeg algorithm to 15,000 bytes that would take only 1.3 hours to transmit.

Image 312 can be further reduced by image processing steps that reduce a black-and-white object to simple line contours or outlines as depicted by image 314 (herein referred to as 'outline contouring'). Line endpoints can be transmitted as a set of x,y coordinates instead of a bitmapped image. Alternative definitions of outlines, contours and vectors utilize arcs, Bezier curves and geometric shapes, all with the goal of wirelessly transmitting meaningful image-based information with a minimal amount of data. When the contours in image 314 are reduced to approximations a still-recognizable object shape can be transmitted with about 800 bytes and require only about 4 minutes over a LoRa connection. Image 316 adds some measurement vectors of the detected object which can enhance the usefulness of the transmitted data while remaining within reasonable data packet sizes for LoRa and LoRaWAN connections.

Reducing transmission times from 20 days to a few minutes makes image-based LoRaWAN feasible for many agriculture, security and natural sciences. Returning to FIGS. 1 and 2, CPU 206 can store full bitmap images on memory components 208 or 210. In cases where additional image processing or analysis performed by users or computers 116, 118 or 122 reveals a high value detection, control signals can be sent back to remote device 10 to proceed with sending more complete image data. A number of open source tools for manipulating digital images can be used to reduce a bit-mapped image to a series of outlines, contours, curves and shapes. Potrace is one such tool that traces bitmapped (herein referred to as 'trace bitmapping') objects into scalable lines. Scalable Vector Graphics (SVG) is an open source system for defining lines and curves as formatted text, SVG exemplifies vector art.

Figure 4:
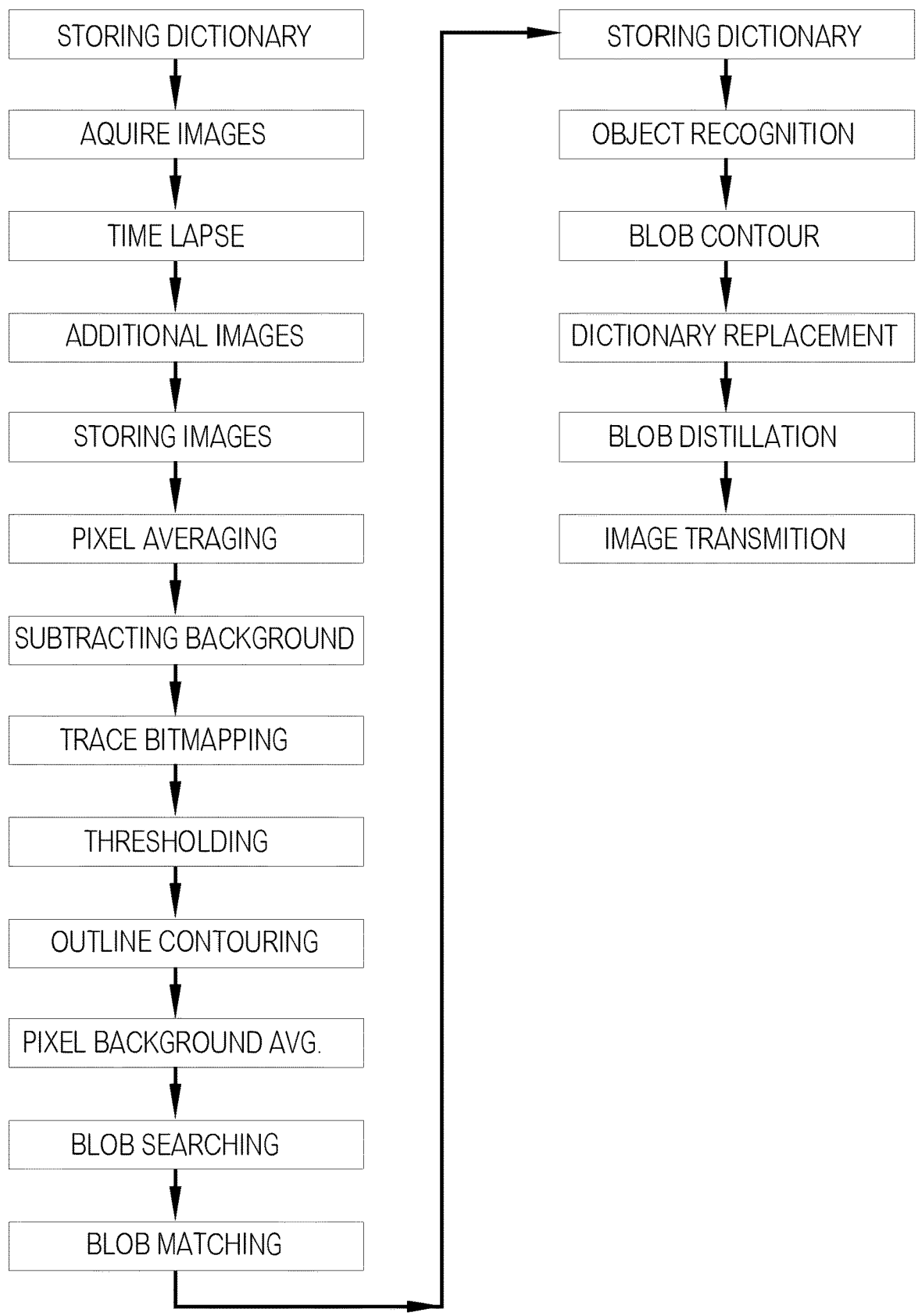
FIG. 4. shows a general representative view of the disclosure's overall method.
Figure 4A:
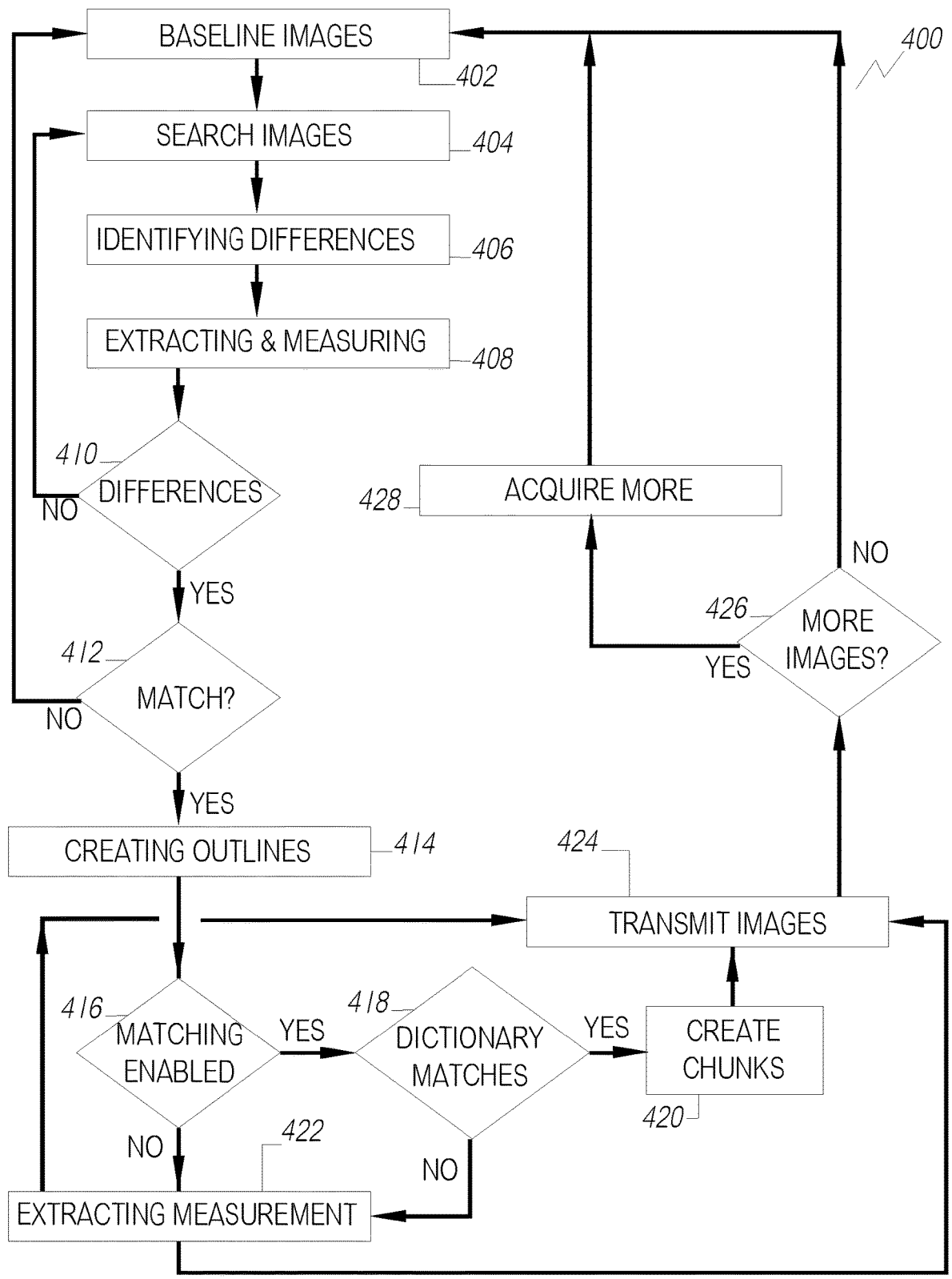
FIG. 4A. illustrates an example of software flow that uses image processing techniques to detect moving objects of interest and then dramatically reduce the data size by representing an image with tools that can optionally include a predefined shape dictionary of graphical elements in addition to or instead of mathematically defined lines, curves and outlines.

FIG. 4 shows a general, representative view of the disclosure's overall method (a more detailed decision tree defining and discussing the terms introduced in FIG. 4 are included in the next section associated with FIG. 4A). The overall, general steps of the method include but are not limited to: storing a digital, predefined, shape dictionary file on the remote device and on a computing device on the data receiving end; acquiring a first baseline image of field conditions using the optical lens and sensors of the remote device size (capturing the shape of moving objects); inserting a time lapse or dwell time (as determined by the user); acquiring additional images of field conditions using the optical lens and sensors of said remote device; storing captured images on the remote device's onboard memory as an array of pixels; performing pixel averaging on a plurality of captured images; subtracting images' static backgrounds by stepping through each of the pixels from at least two images and subtracting corresponding pixel colors; trace bitmapping images using existing, portrace software to further reduce image file size; thresholding the image further reducing image file size; outline contouring further reducing image size; performing pixel background averaging; searching for blobs (searching for chunks of digital assets on moving objects that differ from the baseline background image); performing blob matching (determining if the size and/or shape of blobs match the size and/or shape of targeted objects of interest in an image); performing object recognition (comparing blobs using neural networks and other machine learning software techniques); performing blob contour insertion (creates outlines of the blobs are added to the object of interest by various means including stepping through horizontal rows of image pixels and saving the x,y locations); performing predefined shape dictionary replacement (matching portions of a detected blob or chunk with a predefined dictionary); performing blob distillation (distills the threshold, outlines and measured blobs into small data packets that can be wirelessly transmitted over LoRa or LoRaWAN to additional computing resources); and finally, transmitting image data between the remote device and the using the LoRaWAN gateway module and antenna of claim to the data receiving end.

FIG. 4A depicts an example of decision process 400 implemented by software running on CPU 206. Decision process 400 begins the task of searching for moving objects of interest in step 402 by acquiring a series of images from image sensor 204. These baseline images are averaged together, pixel-by-pixel, to produce a robust image of the background (referred to as 'pixel background averaging'). The software decision process 400 then begins acquiring images in step 404 to search for moving objects that differ from the baseline background. Software step 406 then calculates pixel-by-pixel differences between the newly acquired search images 404 and the background baseline images 402. Software step 408 processes the image pixels and regions that differ from the baseline background. Step 408 identifies areas of substantial difference called blobs. Blobs can be thresholded to produce a simpler and more compact two-tone 312 image than when the pixels contain all of the original color information.

If step 410 determines that there was little difference between the search image and baseline background then it returns to step 404 to acquire another search image. If step 410 does detect sufficient differences between search and baseline it then proceeds to step 412 to determine if the size and/or shape of the detected moving blobs match the size and/or shape of targeted objects of interest in the process called 'blob matching.' Applications typically search for a particular type of target like an animal or intruder where the general size and shape of the target are known ahead of time. The size and shape of the moving blob can then be compared to the detected blobs in step 412. Step 412 can be enhanced using neural networks and other machine learning software techniques referred to as 'object recognition.' If the areas of detected differences appear sufficiently scattered or widespread as to indicate an environmental change instead of a moving object of interest, the software returns to 402 to acquire a new background baseline. Examples of events that can change the background environment include clouds that move in front of the sun, wind blowing background vegetation or the sun's position in the sky gradually changing with time of day.

If step 412 determines that the detected blobs have characteristics that match the target object then step 414 creates outlines of the blobs are added to the object of interest by various means including stepping through horizontal rows of image pixels and saving the x,y locations of transitions through a process called 'blob contouring insertion.' Step 416 provides an option for using a predefined shape dictionary instead of or in addition to object outlines. Image objects can be compared to and replaced by predefined chunks of image objects through the process called 'predefined shape dictionary replacement.' This process sends identifiers and locations for items in a predefined dictionary of object parts requires far less data than sending a complete pixel image representation of the object. Step 418 matches portions of a detected blob with the predefined dictionary. Step 420 provides a way for the software process 400 to define new types of image object chunks that can be forwarded to additional computing resources on the cloud or elsewhere.

Step 422 distills the thresholded, outlined and measured blobs to small data packets that can be wirelessly transmitted over LoRa or LoRaWAN to additional computing resources instep 424 through a process called 'blob distillation.' LoRaWAN provides two-way communication between remote device 102 and additional computing resources. These additional computing resources are typically far more powerful than remote device 102. As such, additional image processing including neural net object recognition can be performed on the image object components sent from device 102. If this additional analysis (step 426) determines that additional higher-resolution images and other sensor (214) data are warranted then the device 102 can be commanded to do so in step 428.

REFERENCES CITED

PATENT DOCUMENTS

U.S. Pat. No. 10,742,399B2 USA August 2020 Yen-Kuang Chen
CN110187653A China April 2019 刘明堂
CN107277536A China July 2017 陈静 何禾 江灏 缪希仁
CN106791258A China January 2017 路晓明
U.S. Pat. No. 9,569,857B2 USA March 2015 William A. Rozzi
CN204046723A China June 2014 杭州市城乡建设设计院有限公司
U.S. Pat. No. 6,941,016B1 USA September 2005 Adam Wagman
U.S. Pat. No. 6,356,274B1 USA March 2002 Donald Spector
US20080229238A1 USA September 2008 Kenneth Young
U.S. Pat. No. 4,542,412A USA September 1985 Shigeru Fuse, et. al.
CN102833537A China Pending Tianjin Normal University

OTHER REFERENCES

Cozzens, T., 2020. LoRaWAN Market Projected to Grow by 47 Percent. [online] GPS World. Available at: https://www.gpsworld.com/lorawan-market-projected-to-grow-by-47-percent/ [Accessed 4 Oct. 2020].
Villan, A. F., 2019. Mastering OpenCV 5 with Python. Packt Publishing Ltd. Birmingham, UK. ISBN 978-1-78934-491-2

What is claimed is:

1. A method for compressing image files compatible with edge computing technologies comprised of the following steps:
  providing a remote device for compressing image files compatible with edge computing technologies comprised of the following parts:
  an electronic circuit board;
  sensors;
  onboard digital image processing software;
  an onboard battery;
  a solar cell;
  an antenna;
  an enclosure; and
  a LoRaWAN gateway
  wherein the onboard digital image processing software is further comprised of algorithms that include background subtraction, cropping, smoothing, sharpening, thresholding, contouring, landmark detection, a predefined shape dictionary, pixel averaging, pixel background averaging, trace bitmapping, thresholding, blob matching, object recognition, blob contour insertion, predefined shape dictionary replacement, and blob distillation for the purpose of sending only contours and shapes of important image content instead of the entire image storing the predefined shape dictionary;
  Acquiring a first baseline image of field conditions;
  inserting a time lapse;
  acquiring additional images of field conditions;
  storing images on the onboard memory as an array of pixels;
  performing pixel averaging on images;
  subtracting the image's static background;
  performing trace bitmapping; (using portrace image file size reduced) thresholding the image;
  outline contouring; (Image file size reduced performing pixel background averaging;
  searching for blobs; (moving objects that differ from the baseline background)
  performing blob matching;
  performing object recognition;
  performing blob contour insertion;
  performing predefined shape dictionary replacement;
  performing blob distillation; and
  transmitting image data between the remote device and the data receiving end.

2. The system for compressing image files compatible with edge computing technologies of claim 1, wherein the electronic circuit board is further comprised of a central processing unit, onboard memory, a transceiver, a LoRaWAN gateway module, an ethernet port, a USB cable port an LTE cellular connection, SD card port and microSD card port.

3. The system for compressing image files compatible with edge computing technologies of claim 1, wherein the sensors is further comprised an image sensor with optical lens, an infrared motion sensor, a temperature sensor, a humidity sensor, a barometric pressure sensor, an ambient light sensor and GPS location sensor.

4. The system for compressing image files compatible with edge computing technologies of claim 1, wherein the onboard digital image processing software is further comprised of a non-transitory computer readable medium including computer readable instructions.

5. The method for compressing image files compatible with edge computing technologies of claim 1, wherein the storing the predefined shape dictionary further comprising the step of storing said predefined shape dictionary on the remote device and a data receiving end.

6. The method for compressing image files compatible with edge computing technologies of claim 1, wherein the acquiring a first baseline image of field conditions includes the step of using the optical lens and sensors to detect the size and shape of moving objects.

7. The method for compressing image files compatible with edge computing technologies of claim 1, wherein the inserting a time lapse includes the step of the user determining said time lapse.

8. The method for compressing image files compatible with edge computing technologies of claim 1, wherein the acquiring additional images of field conditions includes the step of using the optical lens and sensors to detect the size and shape of moving objects.

9. The method for compressing image files compatible with edge computing technologies of claim 1, wherein the subtracting the image's static background includes the step of stepping through each of the pixels from two images and subtracting corresponding pixel colors.

10. The method for compressing image files compatible with edge computing technologies of claim 1, wherein the performing trace bitmapping includes the step of determining if the size and/or shape of blobs match the size and/or shape of targeted objects of interest in an image.

11. The method for compressing image files compatible with edge computing technologies of claim 1, wherein the performing object recognition includes the step of comparing blobs using neural networks and other machine learning software techniques.

12. The method for compressing image files compatible with edge computing technologies of claim 1, wherein the performing blob contour insertion includes the step of creating outlines of the blobs are added to the object of interest by stepping through horizontal rows of image pixels and saving the x,y locations.

13. The method for compressing image files compatible with edge computing technologies of claim 1, wherein the performing predefined shape dictionary replacement includes the step of matching portions of a detected blob or chunk with a predefined dictionary.

14. The method for compressing image files compatible with edge computing technologies of claim 1, wherein the performing blob distillation includes the step of distilling the threshold, outlined and measured blobs to small data packets that can be wirelessly transmitted over LoRa or LoRaWAN to additional computing resources.

15. The method for compressing image files compatible with edge computing technologies of claim 1, wherein the transmitting image data between the remote device and the data receiving end includes the step of using the LoRaWAN gateway module and antenna.

* * * * *